(12) United States Patent
Kuwayama

(10) Patent No.: US 6,308,810 B1
(45) Date of Patent: Oct. 30, 2001

(54) DYNAMIC DAMPER WITH BALANCING MEANS AND METHOD OF MANUFACTURING THE SAME

(75) Inventor: Naohito Kuwayama, Nagoya (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/482,661

(22) Filed: Jan. 13, 2000

(51) Int. Cl.$^7$ .................................................. G01B 11/28
(52) U.S. Cl. ............................................................ 188/379
(58) Field of Search ..................................... 188/378, 379; 267/141; 180/381; 74/574; 464/180

(56) References Cited

U.S. PATENT DOCUMENTS

| | | |
|---|---|---|
| 1,775,403 | 9/1930 | McLeod . |
| 1,934,597 | 11/1933 | Föppl . |
| 2,882,747 * | 4/1959 | Haushalter .............................. 74/574 |
| 2,992,569 * | 7/1961 | Katzenberger ........................ 74/574 |
| 3,080,771 * | 3/1963 | Baldwin ................................. 74/574 |
| 3,319,918 | 5/1967 | Rapata . |
| 3,485,063 * | 12/1969 | Behlmer ..................................... 64/27 |
| 3,771,846 | 11/1973 | Bass et al. . |
| 3,945,269 * | 3/1976 | Bremer, Jr. ............................ 74/574 |
| 4,158,407 | 6/1979 | Rest . |
| 4,223,565 | 9/1980 | Sugiyama et al. . |
| 4,395,809 * | 8/1983 | Whiteley ................................. 29/451 |
| 4,766,405 * | 8/1988 | Daly et al. .......................... 335/257 |
| 4,790,672 * | 12/1988 | Komplin ............................... 384/125 |
| 4,884,666 * | 12/1989 | Stahl ..................................... 188/378 |
| 4,889,328 * | 12/1989 | Uno et al. ............................ 267/293 |
| 4,943,263 * | 7/1990 | Zyohagara et al. .................. 464/180 |
| 4,961,254 * | 10/1990 | Andra et al. ........................... 29/173 |
| 5,024,425 * | 6/1991 | Schwerdt ........................... 267/140.1 |
| 5,056,763 | 10/1991 | Hamada et al. . |
| 5,090,668 * | 2/1992 | Hamada .............................. 267/141 |
| 5,135,204 * | 8/1992 | Funahashi ......................... 267/141.1 |
| 5,168,774 * | 12/1992 | Andra et al. ........................... 75/574 |
| 5,386,894 * | 2/1995 | Barca ................................... 188/379 |
| 5,503,043 * | 4/1996 | Olbrich ................................. 74/574 |
| 5,593,144 | 1/1997 | Hamada et al. . |
| 5,660,256 * | 8/1997 | Gallmeyer et al. ................. 188/379 |
| 5,671,909 * | 9/1997 | Hamada et al. ..................... 267/141 |

FOREIGN PATENT DOCUMENTS

| | | |
|---|---|---|
| 0 356 917 | 3/1990 | (EP) . |
| 0 409 202 A1 | 1/1991 | (EP) . |
| 0 409 704 A1 | 1/1991 | (EP) . |
| 1040109 | 8/1966 | (GB) . |
| A-2-93155 | 6/1990 | (JP) . |
| A-2-129431 | 8/1990 | (JP) . |
| Y2-2-31626 | 8/1990 | (JP) . |
| A-2-190641 | 10/1990 | (JP) . |
| A-3-37450 | 5/1991 | (JP) . |
| A-4-140536 | 9/1992 | (JP) . |
| A-4-321420 | 11/1992 | (JP) . |
| A-5-44779 | 7/1993 | (JP) . |
| A-8-28627 | 2/1996 | (JP) . |

* cited by examiner

Primary Examiner—Robert J. Oberleitner
Assistant Examiner—Benjamin A. Pezzlo
(74) Attorney, Agent, or Firm—Burr & Brown

(57) ABSTRACT

A dynamic damper for damping vibration of a rotary shaft is disclosed. The dynamic damper includes: (a) a mass member having a generally cylindrical shape and formed by rolling into the generally cylindrical shape, with circumferentially opposite end portions of the plate being circumferentially opposed to each other, and with the circumferentially opposite end portions being unconnected to each other; (b) an elastic support member to be mounted on the rotary shaft, for elastically supporting the mass member with respect to the rotary shaft such that the mass member is displaceable relative to the rotary shaft; and (c) balancing means for maintaining a rotary balance of the mass member about an axis of the mass member.

15 Claims, 5 Drawing Sheets

DYNAMIC DAMPER WITH BALANCING MEANS AND METHOD OF MANUFACTURING THE SAME

BACKGROUND OF THE INVENTION

1. Field of the Invention

The present invention relates in general to a dynamic damper serving as a dynamic vibration absorber, and a method of manufacturing the same. More particularly, the invention is concerned with such a dynamic damper which is to be attached to a rotary shaft, such as a drive shaft of a motor vehicle, for damping or absorbing vibrations of the rotary shaft, and a method of manufacturing the same.

2. Discussion of the Related Art

There is known a dynamic damper, as disclosed in JP-Y2-02-31626 and JP-A-08-28627, for damping vibrations which are applied to a rotary shaft such as a drive shaft of a motor vehicle in an axial direction of the rotary shaft as well as in a direction perpendicular to the axial direction. The dynamic damper includes a matallic mass member which has a generally cylindrical shape, and an elastic support member which is to be mounted on the rotary shaft. The elastic support member elastically supports the metallic mass member with respect to the rotary shaft such that the mass member is displaceable relative to the rotary shaft as the elastic support member is mounted on the rotary shaft. The thus constructed dynamic damper minimizes transmission of the vibrations and noises of the rotary shaft to the other components, and also restrains a stress amplitude of the rotary shaft for thereby effectively preventing fatigue failure of the rotary shaft.

In recent years, there is a demand for further improved efficiency and further reduced cost of manufacture of the dynamic damper. To meet such a demand, there are required some improvements in the construction of the dynamic damper.

SUMMARY OF THE INVENTION

It is therefore a first object of the present invention to provide a dynamic damper having an improved construction which is easy to manufacture at a reduced cost while assuring a sufficiently high vibration damping effect.

It is a second object of the present invention to provide a method suitable for manufacturing such a dynamic damper.

The above first object may be achieved according to a first aspect of the present invention, which provides a dynamic damper for damping vibration of a rotary shaft, comprising: (a) a mass member having a generally cylindrical shape and formed from a plate having a predetermined contour, the plate being rolled into the generally cylindrical shape and including circumferentially opposite end portions which are opposed to each other in a circumferential direction thereof and which are not fixed to each other; (b) an elastic support member to be mounted on the rotary shaft, for elastically supporting the mass member with respect to the rotary shaft such that the mass member is displaceable relative to the rotary shaft; and (c) balancing means for maintaining a rotary balance of the mass member about an axis of the mass member.

In the conventional dynamic damper, the mass member is, in general, formed by cutting a drawn or otherwise formed metallic pipe, to a suitable length, or alternatively, is a cylindrical metallic member which has been formed by forging or casting or by other suitable methods. A study made by the inventor of the present invention revealed that such a conventional dynamic damper requires a high level of skill and a high cost of manufacture, and that there was still some room for improvement in terms of its manufacturing efficiency and cost. In this view, the inventor attempted to form the mass member by rolling a metal plate, which has been formed by a blanking or other operation, into a cylindrical shape such that circumferentially opposite end portions of the metal plate were circumferentially opposed to each other. The thus constructed mass member can be produced more easily and economically than the conventional mass member. However, it was found that the thus constructed mass member suffered from an imbalance of the mass member, i.e., an uneven distribution of mass in the circumferential direction of the mass member, due to the presence of a circumferential gap between the circumferentially opposite end portions of the metal plate, thereby possibly deteriorating the vibration damping capability of the dynamic damper and also the durability of the elastic support member. It might be possible to eliminate the circumferential gap by welding, bonding or otherwise connecting together the circumferentially opposite end portions of the metal plate. However, such a welding or connection may be another cause of an imbalance of the mass member, requiring a further adjustment of the mass distribution in the mass member.

The present invention has been developed based on the above-described findings. In the dynamic damper constructed according to the present invention, the uneven amass distribution in the mass member is compensated for or corrected by the provision of the balancing means in the dynamic damper, without connecting or fixing the circumferentially opposite end portions of the metal plate to each other even if the circumferentially opposite end portions are circumferentially spaced apart from each other with a circumferential gap therebetween. According to this arrangement, the mass member is formed from the metal plate which is easily and economically produced, while an even mass distribution in the circumferential direction of the mass member is advantageously assured owing to the balancing means, without welding or other cumbersome operation. Thus, the present dynamic damper can be efficiently manufactured at a reduced cost, while assuring a sufficiently high vibration damping effect.

According to a first preferred form of the first aspect of the invention, the circumferentially opposed end portions of the plate are circumferentially spaced apart from each other with a circumferential gap therebetween, and the balancing means cooperates with the circumferential gap to maintain the balance of the mass member about the axis, the balancing means comprising at least one of mass-reducing means for reducing a mass in a circumferentially central portion of the plate which is substantially diametrically opposed to the circumferential gap, and mass-increasing means for increasing a mass in the circumferentially opposite end portions of the plate.

The circumferential gap possibly causes an uneven mass distribution in the mass member, resulting in a rotary imbalance of the mass member about the axis. However, the possible uneven mass distribution is advantageously compensated for by the balancing means. In other words, the balancing means cooperates with the circumferential gap to maintain the rotary balance of the mass member about the axis. The imbalance caused by the weight reduction due to the circumferential gap is advantageously corrected, for example, by reducing the mass of the circumferentially central portion which is substantially diametrically opposed to the circumferential gap, or alternatively by increasing the mass of the circumferentially opposite end portions which are adjacent to the circumferential gap.

According to a second preferred form of the first aspect of the invention, the balancing means comprises mass-reducing means for reducing a mass of at least one local portion of the plate, the at least one local portion being located in a circumferentially central portion of the plate which is substantially diametrically opposed to the circumferentially opposite end portions of the plate.

The mass-reducing means preferably comprises at least one hole formed in the at least one local portion of the plate. The hole may be a blind hole or a through-hole extending in a thickness direction of the plate. Further, the mass-reducing means may comprise a concavity, recess, or means for reducing an axial length of the circumferentially central portion of the plate, in place of or in addition to the hole. The recess may be preferably formed at each of the axially opposite end faces of the circumferentially central portion of the plate so as to extend axially inwardly from the end face. Since the recess defines a part of the outer periphery or contour of the plate from which the mass member is formed, it is possible, for example, to advantageously form the recess simultaneously with the other part of the contour of the plate, with a single blanking die in a pressing operation.

According to one advantageous arrangement of the second preferred form of the first aspect of the invention, the plate is obtained from an intermediate product which is formed from a sheet material in a blanking operation, the intermediate product having a plurality of final product portions each of which has the predetermined contour so as to provide the plate and which are arranged and spaced apart from each other in a predetermined direction, and a plurality of bridge portions each of which is interposed between two of the final product portions adjacent to each other in the predetermined direction so as to connect the two adjacent final product portions, each of the final product portions being connected, in a central portion thereof which corresponds to the circumferentially central portion of the plate, to the bridge portions, and wherein the mass-reducing means comprises at least one recess provided in a cutting portion of each of the final product portions which is adjacent to the corresponding one of the bridge portions and in which each of the final product portions is cut off from the corresponding one of the bridge portions.

The above-described at least one recess is preferably located on at least one of opposite sides of each of the bridge portions in a direction perpendicular to the predetermined direction in which the final product portions are arranged, and is formed in an end face of the corresponding one of the final product portions, the end face being perpendicular to the predetermined direction.

Where the plate having the predetermined contour is obtained from the intermediate product as defined above, a large number of the mass members can be efficiently produced at a reduced cost. Further, it is possible to provide the recess or recesses in the cutting portion of each final product portion of the intermediate product. The recess serves to facilitate a shearing or cutting operation which is achieved, after the intermediate product is formed by the blanking operation, so as to cut off each final product portion from the corresponding bridge portion. That is, even if there is a positioning error of a shearing blade or die relative to the cutting portion of each final product portion in the shearing operation, the recess permits the final product portion to be satisfactorily cut off from the bridge portion, providing the final product portion with an excellent cut face. The recess also serves as the mass-reducing means. The balance of the mass member can be adjusted by suitably designing the shape and size of the recess, without using or providing an additional member or portion exclusively functioning as the mass-reducing means.

It is noted that the intermediate product may be formed on a press, preferably, according to a cut-and-carry method in which the plurality of final product portions are successively blanked or punched, while the sheet material is fed by a suitable amount in the above-described predetermined direction in which the final product portions are arranged, after each of the successive punching operations.

According to a third preferred form of the first aspect of the invention, the balancing means comprises a plurality of through-holes formed through the plate in a thickness direction of the plate and circumferentially spaced apart from each other, the plurality of through-holes having respective diameters different from each other.

According to an advantageous arrangement of the above-described third preferred form, the plurality of through-holes comprises at least one large hole and at least one small hole having a diameter smaller than that of the at least one large hole. The at least one small hole is located circumferentially more remote from a circumferentially central portion of the plate which is substantially diametrically opposed to the circumferentially opposite end portions, than the at least one large hole.

The provision of the plurality of through-holes arranged in the circumferential direction permits the mass member to be further accurately balanced, and also facilitates adjustment of the mass distribution of the mass member and accordingly tuning of the vibration damping characteristics of the dynamic damper, for example, by suitably determining the size of each of the through-holes. Further, where the mass member is covered at its outer and inner circumferential surfaces by a covering layer made of a rubber material, for example, the covering layer may include portions filling the through-holes in addition to portions covering the respective outer and inner circumferential surfaces of the mass member. This arrangement permits the portions covering the circumferential surfaces of the mass member, to be integrally connected with each other through the portion filling the through-holes, whereby the covering layer in its entirety is firmly fixed to the mass member. If the covering layer is formed of an elastic rubber body integrally with the elastic support member, this arrangement advantageously increases a bonding strength of the mass member to the elastic support member, thereby providing the dynamic damper with a further rigid structure. It is noted that the through-holes may be formed before or after formation of the outer contour or profile of the plate, or may be formed together with the outer contour of the plate in a single pressing step by using, for example, a compound or combination die.

According to a fourth preferred form of a first aspect of the present invention, the balancing means comprises mass-increasing means for increasing a mass of at least one local portion of the plate, the at least one local portion being located in the circumferentially opposite end portions of the plate. The mass-increasing means preferably comprises at least one protrusion formed in the at least one local portion of the plate and protruding axially outwardly from the at least one local portion of the plate.

According to a fifth preferred form of a first aspect of the present invention, the elastic support member is formed of an elastic body, and comprises a tubular potion which is to be fitted onto the rotary shaft and which is located radially inwardly of the mass member and placed in a substantially coaxial relation with the mass member, and an elastically connecting portion which is formed integrally with the tubular portion and which elastically connects the tubular portion and the mass member.

The above-described second object may be achieved according to a second aspect of the present invention, which provides a method of manufacturing each of the dynamic dampers defined in the above-described preferred forms of the first aspect of the present invention. The method comprises (i) a step of positioning the mass member in a mold serving to form the elastic support member, with the mass member being held in contact, in at least three portions of an outer circumferential surface of the mass member circumferentially spaced apart from each other, with a positioning protrusion provided in the mold, so that the mass member is prevented from being displaced relative to the mold in a radial direction of the mass member; and (ii) a step of injecting a molding material into a mold cavity of the mold through an injection hole located radially inwardly of the mass member which is positioned in the mold, for thereby forming the elastic support member.

In the dynamic damper constructed according to the present invention in which the mass member is formed from the plate rolled into the generally cylindrical shape with the circumferentially opposite end portions being unconnected to each other, the circumferentially opposite end portions are likely to be displaced away from each other, whereby the mass member may undesirably lose the predetermined generally cylindrical shape, or the diameter of the mass member may be undesirably increased, particularly where the injection hole through which the molding material is injected into the mold cavity is located radially inwardly of the mass member which is positioned in the mold. In the method according to the second aspect of the invention, however, the mass member is advantageously prevented by the positioning protrusion, from being radially outwardly deformed or being displaced relative to the mold in the radial direction due to the pressure of the injected molding material which is applied to the mass member in the injecting step. Thus, the predetermined generally cylindrical shape of the mass member, which shape has been established prior to the setting of the mass member in the mold, is advantageously maintained throughout the injecting step.

According to a first preferred form of the second aspect of the present invention, the positioning protrusion has a contact surface which is held in contact with the outer circumferential surface of the mass member, and the contact surface has a circumferential dimension larger than a circumferential dimension of a circumferential gap defined by the circumferentially opposite end portions of the plate.

If the circumferentially opposite end portions are spaced apart from each other with a circumferential gap therebetween, it is preferable that the contact surface of the positioning protrusion has a circumferential dimension larger than the circumferential dimension of the circumferential gap, so that the positioning protrusion is prevented from entering the circumferential gap without contacting the outer circumferential surface of the mass member, irrespective of the positioning of the mass member relative to the mold in the circumferential direction.

According to a second preferred form of the second aspect of the present invention, the positioning protrusion comprises at least three positioning protrusions which are circumferentially spaced apart from each other, and which are positioned adjacently to axially opposite end faces of the mass member with the mass member being positioned in the mold, so that the mass member is held in contact, at the outer circumferential surface and the axially opposite end faces of the mass member, with the positioning protrusions, for thereby preventing the mass member from being displaced relative to the mold in an axial direction of the mass member as well as in the radial direction.

In the method according to the second preferred form of the second aspect of the invention, the mass member is advantageously positioned by the positioning protrusions relative to the mold in the axial direction as well as in the radial direction. Further, since the mass member can be assuredly positioned relative to the mold even if each positioning protrusion does not have a large surface area of contact with the mass member, it is possible to maximize the surface area of the mass member which is covered by the elastic support member.

The above-described second object may be achieved also by a third aspect of the present invention, which provides a method of manufacturing each of the dynamic dampers defined in the above-described preferred forms of the first aspect of the present invention. The method comprises: (i) a step of measuring a rotary balance of the mass member about an axis of the mass member, before the mass member is fixed to the elastic support member; (ii) a step of determining an arrangement of the balancing means on the basis of a result of the measurement of the rotary balance, so as to change a mass of at least one local portion of the plate for thereby adjusting the rotary balance; and (iii) a step of providing the dynamic damper with the balancing means having the determined arrangement.

In the present method, the rotary balance of the mass member is adjusted after the mass member has been formed by rolling the plate into the substantially cylindrical shape, thereby permitting the mass member to be further accurately balanced so that the dynamic damper exhibits a further improved vibration damping performance. For the measurement of the rotary balance of the mass member about the axis, it is possible to employ any known measuring device which is adapted to rotate the mass member about its axis and detect a condition required for establishing the balance in a static state of the mass member, and preferably also a condition required for establishing the balance in a dynamic state of the mass member. The arrangement of the balancing means such as the mass-reducing means or the mass-increasing means is determined to satisfy the required condition. It is noted that the balancing means may be provided on the dynamic damper prior to the measurement of the rotary balance, before or after the plate is rolled into the mass member. In this case, the arrangement of the balancing means can be modified or changed, if needed, on the basis of the measurement of the rotary balance, for thereby further improving the rotary balance.

BRIEF DESCRIPTION OF THE DRAWINGS

The above objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
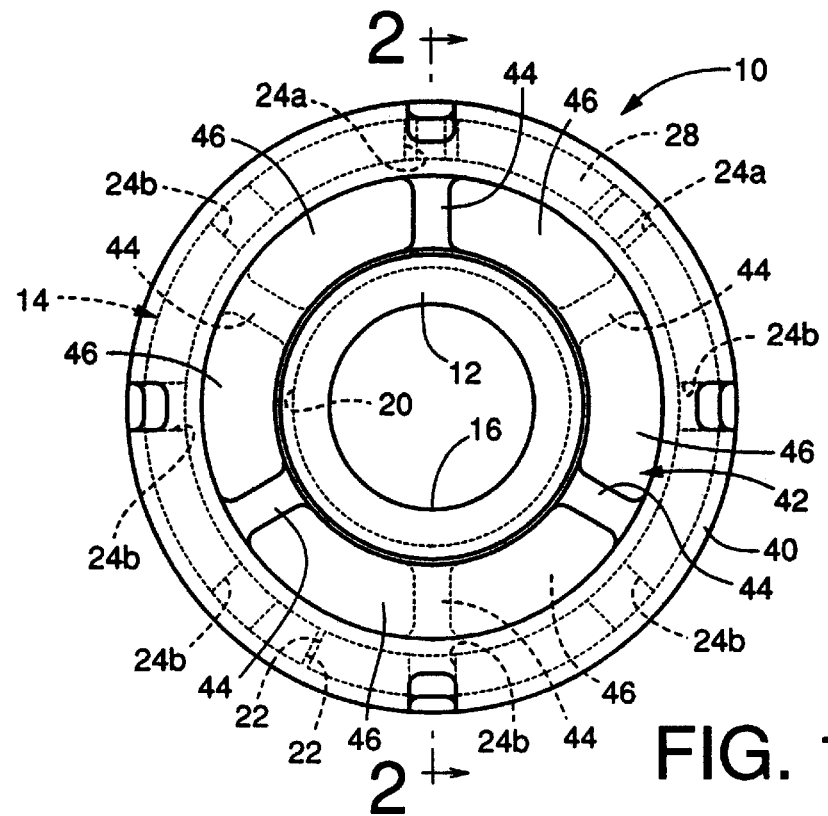
FIG. 1 is a front elevational view of a dynamic damper according to one embodiment of this invention.
Figure 2:
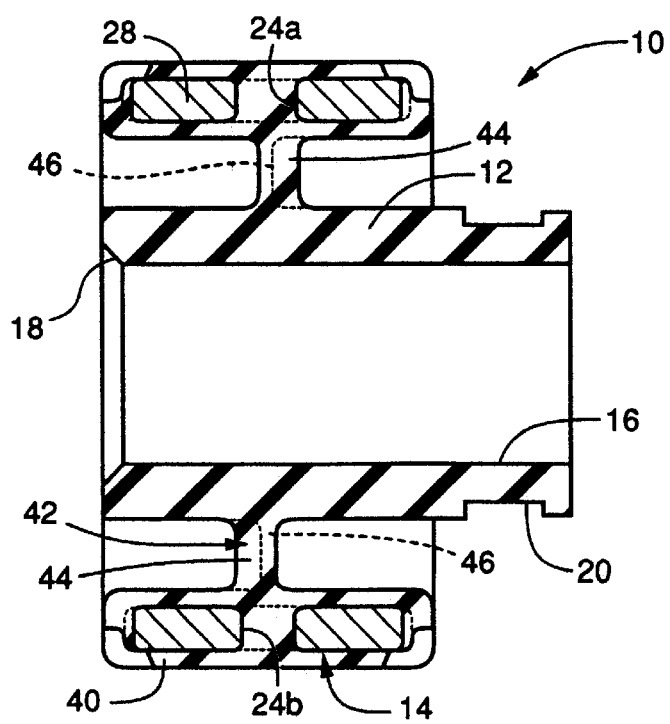
FIG. 2 is a cross sectional view taken along line 2—2 of FIG. 1.

Referring first to FIGS. 1 and 2, there is shown a dynamic damper 10 constructed according to an embodiment of the present invention. This dynamic damper 10 is designed to be mounted on a drive shaft of a motor vehicle of front-engine, front-drive type, and serves as a dynamic damping device for restraining or absorbing bending vibrations of the drive shaft, i.e., vibrations of the drive shaft in a direction substantially perpendicular to the axis of rotation of the drive shaft, namely, vibrations applied to the drive shaft in its radial direction. The dynamic damper 10 includes a tubular portion 12 which is fitted onto the drive shaft, and a mass member 14 which is located radially outwardly of the tubular portion 12 and which is elastically connected to or supported by the tubular portion 12.

Described more specifically, the tubular portion 12 is an elastic body which is made of an elastically deformable material such as a rubber, and has a generally cylindrical or annular shape. The tubular portion 12 has an axial hole 16 formed therethrough and extending in its axial direction. The axial hole 16 has an inside diameter slightly smaller than an outside diameter of the drive shaft, so that the drive shaft is press-fitted in the axial hole 16, such that the inner circumferential surface of the axial hole 16 or of the tubular portion 12 is held in pressing contact with the outer circumferential surface of the drive shaft, owing to an elasticity of the tubular portion 12. The inner circumferential surface of the tubular portion 12 includes a tapered section 18 which is located at one of the opposite axial end portions of the tubular portion 12 (at the left-side end portion of the tubular portion 12 as viewed in FIG. 2) and which extends over a small distance in the axial direction. The tapered section 18 has a diameter which is progressively increased as the tapered section 18 extends outwardly in the axial direction, thereby facilitating introduction of the drive shaft through the tapered portion 18 into the axial hole 16. The tubular portion 12 further has an annular groove 20 formed in its outer circumferential surface. The annular groove 20 is located in the vicinity of the other axial end portion of the tubular portion 12 (in the vicinity of the right-side end portion of the tubular portion 12 as viewed in FIG. 2) which is remote from the tapered section 18, and circumferentially extends over the entire circumference of the tubular portion 12. After the dynamic damper 10 is mounted on the drive shaft at its tubular portion 12, the tubular portion 12 is fixed to the drive shaft, immovably relative to the drive shaft in the axial and circumferential directions, by suitable means such as a retainer band which is made of a hard material such as a metal. The retainer band is received in the annular groove 20, and is then fastened tightly, so that the tubular portion 12 is firmly fixed to the drive shaft.

The mass member 14, surrounding the tubular portion 12 has a generally cylindrical or annular shape, like the tubular portion 12. The mass member 14 is spaced apart from the tubular portion 12 in the radial direction, and has a coaxial relationship with the tubular portion 12. The mass member 14 has an axial length smaller than that of the tubular portion 12, and is positioned relative to the tubular portion 12 so as to be axially offset by a given amount with respect to the tubular portion 12 in a direction toward the above-described one of the opposite axial end portions of the tubular portion 12 (in the leftward direction as viewed in FIG. 2) so that the annular groove 20 located in the vicinity of the other axial end portion is not covered by the mass member 14. This arrangement facilitates attachment and removal of the retainer band to and from the annular groove 20.

Figure 3:
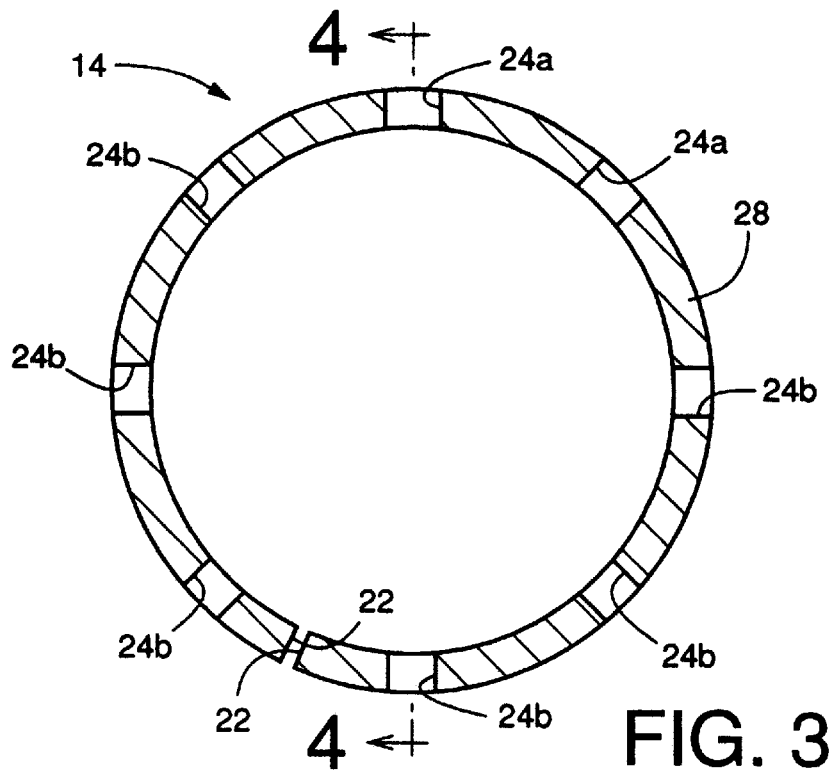
FIG. 3 is an elevational view in transverse cross section of a mass member of the dynamic damper of FIG. 1.
Figure 4:
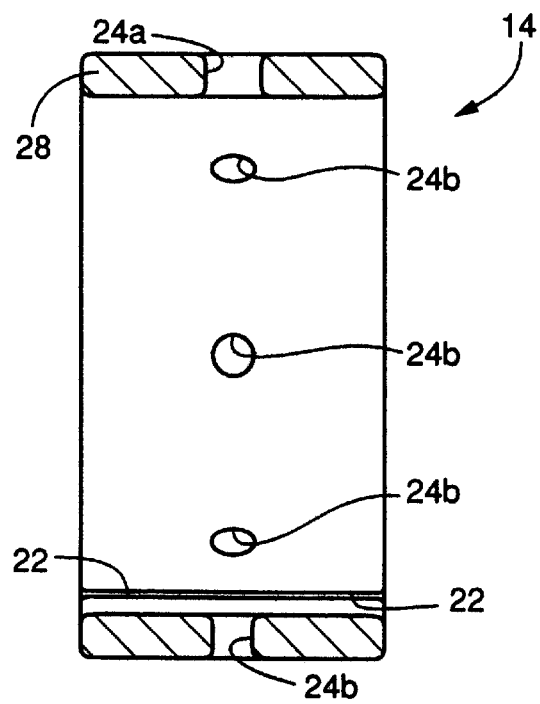
FIG. 4 is a cross sectional view taken along line 4—4 of FIG. 3.

The mass member 14 may be formed of a metal or other material having a mass larger than that of the elastic body which forms the tubular portion 12. In the present embodiment, the mass member 14 is formed of one sheet of elongated, flat plate 28 made of a steel metal and having a predetermined contour. The flat plate 28 is rolled or bent into the generally cylindrical or annular shape with a substantially constant radius of curvature, as shown in FIGS. 3 and 4, such that longitudinally opposite end faces 22, 22 of the flat plate 28 are positioned to be circumferentially opposed to each other with a small circumferential gap or spacing therebetween. The mass member 14 has eight through-holes 24 formed therethrough and extending in the radial direction, i.e., in the thickness direction of the flat plate 28. The eight through-holes 24 are located in an axially intermediate portion of the mass member 14, and are substantially equally spaced apart from each other in the circumferential direction of the mass member 14.

The flat plate 28, from which the mass member 14 is formed as described above, may be advantageously obtained, for example, by blanking or punching a hot- or cold-rolled steel plate as a sheet material on a press. In the present embodiment, the flat plate 28 is formed from the rolled steel plate in the form of a strip 26 according to a cut-and-carry method, so that a plurality of the flat plates 28 are successively formed from the strip 26. Described more specifically, referring to FIG. 5, an intermediate product 32 is first obtained, by performing successive punching or blanking operations on the strip 26 while the strip 26 is carried or fed by a feed device in a longitudinal direction of the strip 26 by a feed device after each of the successive punching operation. The intermediate product 32 consists of a plurality of final product portions 28 each of which has the above-described predetermined contour so as to provide the flat plate 28 and which are arranged in the longitudinal direction of the strip 26, and a plurality of bridge portions 30 each of which is interposed between two of the final product portions 28 adjacent to each other in the longitudinal direction of the strip 26 so as to connect the two adjacent final product portions 28. The intermediate product 32 is then transferred to another press or a shearing machine, at which the intermediate product 32 is subjected to a cutting operation. Each final product portion 28 has two cutting portions 34 which are adjacent to the corresponding two bridge portions 30, respectively. In the cutting operation, each final product portion 28 is cut off, at the two cutting portions 34, from the two bridge portion 30, so that the flat plates 28 each having the predetermined contour are obtained.

It is noted that the eight through-holes 24 and the outer contour of the flat plate 28 may be formed in a single step by using a compound die, or alternatively may be formed in two steps by using progressive dies consisting of a piercing die and a blanking die which are arranged in the direction in that the strip 26 is fed by the feed device, such that the though-holes 24 are first formed by the piercing die, and the outer contour of the flat plate 28 is then formed by the blanking die. The thus obtained flat plate 28 is subjected to a known forming operation, such as a roll bending, pulling, or a drawing operation with a suitable roll forming die, in which the flat plate 28 is rolled about a line extending perpendicularly to the longitudinal direction of the flat plate 28, with a substantially constant radius of curvature, so as to form the mass member 14 having the generally cylindrical or annular shape.

Figure 5:
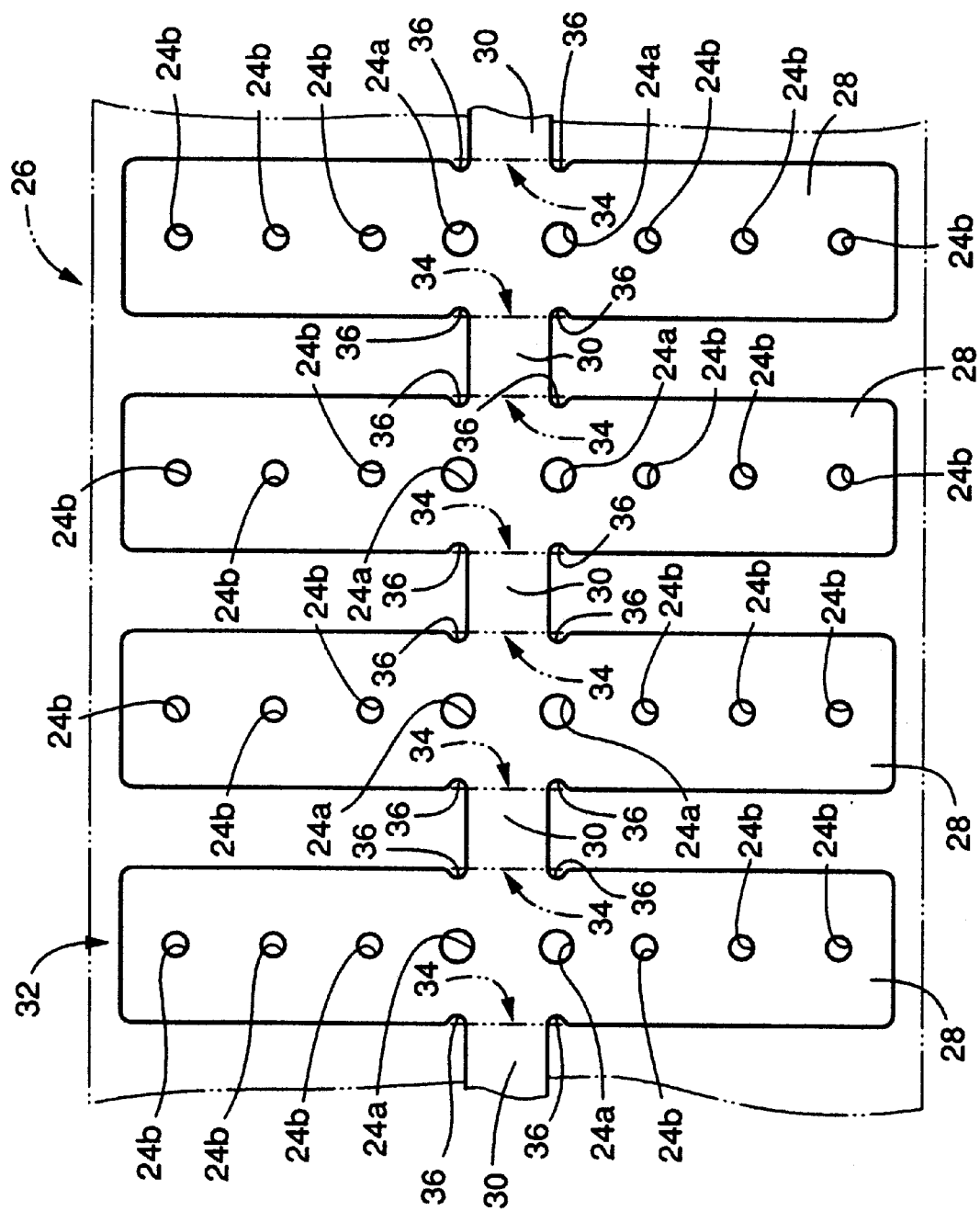
FIG. 5 is a plan view of an intermediate product from which a plurality of plates each used for forming the mass member of FIG. 3 are obtained.

Each of the eight through-holes 24 formed through the flat plate 28 has a circular shape in its cross section, as shown in FIG. 5. The through-holes 24 are substantially equally spaced apart from each other in the longitudinal direction of the flat plate 28, so that these holes 24 are positioned to be substantially equally spaced apart from each other in the circumferential direction after the flat plate 28 is rolled or wound up into the mass member 14. The eight through-holes 24 consist of two large holes 24a each having an inside diameter, and six small holes 24b each having an inside diameter and smaller than that of each large hole 24a by a suitable amount. The two large holes 24a are located in the longitudinally central portion of the flat plate 28, and the six small holes 24b are located on the opposite sides of the large holes 24a in the longitudinal direction. That is, the outermost, the second outermost and the third outermost of the through-holes 24 as viewed in the longitudinal direction are the small holes 24b, while the others are the large holes 24a.

In the intermediate product 32, each bridge portion 30 extends, in the width direction of the final product portion 28, between the longitudinally central portions of the two adjacent final product portions 28, thereby connecting the two adjacent final product portions 28, 28. Each final product portion 28 has four recesses 36 formed at respective four corners which are defined by the final product portion 28 and the corresponding adjacent bridge portions 30. More specifically, the four recesses 36 are provided in the cutting portions 34 of the final product portion 28 which are adjacent to the corresponding two bridge portions 30, and are positioned on the widthwise opposite sides of the bridge portions 30 so that the recesses 36 are spaced apart from a longitudinally center line of the final product portion 28 in the longitudinal direction by a substantially constant distance. Each recess 36 extends inwardly from the corresponding one of the opposite side edges of the final product portion 28 in the widthwise direction of the final product portion 28, and has a substantially semi-circular shape so as to be concave toward the other side edge.

The recesses 36 serve to facilitate the cutting or shearing operation in which the final product portions 28 are cut at the cutting portions 34 so as to be separated from the bridge portions 30. That is, even if there is a positional error of a shearing blade or die relative to the cutting portion 34 in the shearing operation, the recesses 36 permit the final product portion 28 to be satisfactorily cut off from the bridge portion 30, without the final product portion 28 being damaged or otherwise adversely influenced by the positioning error of the shearing die, providing the final product portion or flat plate 28 with an excellent cut surface. In the present embodiment, the recesses 36 are located on the opposite sides of the large holes 24a in the width direction of the flat plate 28, and are aligned with the large holes 24a in the longitudinal direction of the flat plate 28. More precisely, two of the four recesses 36, which are located at the same position in the longitudinal direction, are aligned with the corresponding one of the two large holes 24a in the longitudinal direction. The substantially semi-circular shape of each recess 36 has a radius of curvature slightly smaller than that of the circular shape of each large hole 24a. After the flat plate 28 has been rolled or wound up into the mass member 14, the two large holes 24a and the four recesses 36 are positioned so as to be substantially diametrically opposed to the circumferential gap defined by the circumferentially opposite end faces 22, 22, as shown in FIG. 3, and so as to be symmetric with respect to a line which extends in the radial direction of the mass member 14 and which passes through the axis of the mass member 14 and the circumferential center of the circumferential gap.

The above-described arrangement contributes to compensation for an uneven mass distribution in the circumferential direction of the mass member 14 which would be caused due to the circumferential gap between the opposite end faces 22, 22. That is, the mass reduction due to the circumferential gap is advantageously offset by the mass reduction owing to the two large holes 24a, 24a and the four recesses 36 which are positioned to be substantially diametrically opposed to the circumferential gap, thereby satisfying conditions required for establishing a static balance and a dynamic balance of the mass member 14 about the axis. The size of each large hole 24a (relative to the size of each small hole 24b) and the size of each recess 36 are suitably determined depending upon an amount of the mass reduction due to the circumferential gap, so as to satisfy the conditions for the static and dynamic balance of the mass member 14. In the present embodiment, the two large holes 24a, 24a and the four recesses 36 cooperate to constitute mass-reducing means for reducing the mass in at least one local portion of the flat plate 28 which portion is located to be substantially diametrically opposed to the circumferentially opposite end faces 22, 22 of the flat plate 28, or balancing means for maintaining the balance of the mass member 14 about the axis of the mass member 14.

The mass member 14 is subjected to a measuring operation, if needed, in which the static balance of the mass member 14 about the axis, or the dynamic balance of the mass member 14 about the axis is measured by a known measuring device, so that cavities or holes having a suitable shape are additionally formed in the axial end face or outer or inner circumferential surface of the mass member 14, on the basis of the measurement result, so as to establish a higher degree of the balance of the mass member 14.

The mass member 14 constructed as described above is covered at its inner and outer circumferential surfaces by a covering layer 40 made of a rubber material and having a thickness substantially constant in the circumferential direction. The inner and outer circumferential surfaces of the mass member 14 are held in contact with the covering layer 40, which may or may not be bonded to those surfaces, so that the mass member 14 is not exposed to the atmosphere, for thereby preventing or minimizing an oxidation of the surfaces of the mass member 14. The eight through-holes 24 and the circumferential gap between the circumferentially opposite end faces 22, 22 are filled with portions of the covering layer 40. That is, the covering layer 40 includes portions filling the through-holes 24 and a portion filling the circumferential gap, in addition to portions covering the circumferential surfaces of the mass member 14. The portions covering the circumferential surfaces of the mass member 14 are integrally connected with each other by the portions filling the through-holes 24 and the circumferential gap, whereby the covering layer 40 in its entirety is firmly fixed to the mass member 14.

Between the tubular portion 12 and the mass member 14, there is interposed an elastically connecting portion 42 which is formed of a rubber material, integrally with the tubular portion 12 and the covering layer 40. The elastically connecting portion 42 bridges surfaces of the tubular portion 12 and the mass member 14 which surfaces are radially opposed to each other, so as to elastically connect the mass member 14 and the tubular portion 12. Described more specifically, the elastically connecting portion 42 includes six reinforcing leg portions 44 each extending straight in the radial direction of the dynamic damper 10, and six thin-walled plate portions 46 connecting the adjacent reinforcing leg portions 44, so as to close each window defined by the circumferentially adjacent two reinforcing leg portions 44. The tubular portion 12 and the mass member 14 are connected to each other with a high degree of strength, owing principally to the six reinforcing leg portions 44 each having an axial dimension larger than that of each of the plate portions 46. The plate portions 46 extend between the adjacent reinforcing leg portions 44 in the circumferential direction of the dynamic damper 10, and extend from an axially intermediate portion of the mass member 14 to the corresponding axial portion of the tubular portion 12 in the radial direction. Every second of the six reinforcing leg portions 44 as viewed in the circumferential direction projects from the plate portions 46 in one of the axially opposite directions, while each of the other reinforcing leg portions 44 projects from the plate portions 46 in the other of the axially opposite directions. In other words, the two adjacent reinforcing leg portions 44 axially project from the plate portions 46 in the respective opposite directions. The thus constructed elastically connecting portion 42 functions not only to maintain the dynamic balance of the mass member 14 about the axis, but also to simplify the structure of a mold to be used for forming the connecting portion 42, thereby facilitating the forming operation with the mold. It is noted that in the present embodiment, the tubular portion 12, the covering layer 40 and the elastically connecting portion 42 cooperate with each other to constitute an elastic support member which serves to elastically support the mass member 14 with the respect to the drive shaft.

In the present embodiment, the covering layer 40 and the elastically connecting portion 42 are formed, integrally with the tubular portion 12, of the above-described elastic body as an integral structure, by vulcanization of a rubber material within a suitable mold. The mass member 14 is embedded in the rubber material during the vulcanization, so that the mass member 14 is incorporated in the elastic body. That is, the mass member 14, which has been independently formed, is first positioned at a predetermined position within the mold for forming the elastic body which includes the tubular portion 12, the covering layer 40 and the elastically connecting portion 42. The suitable rubber material is then injected into the mold, and vulcanized in a known manner.

Figure 6:
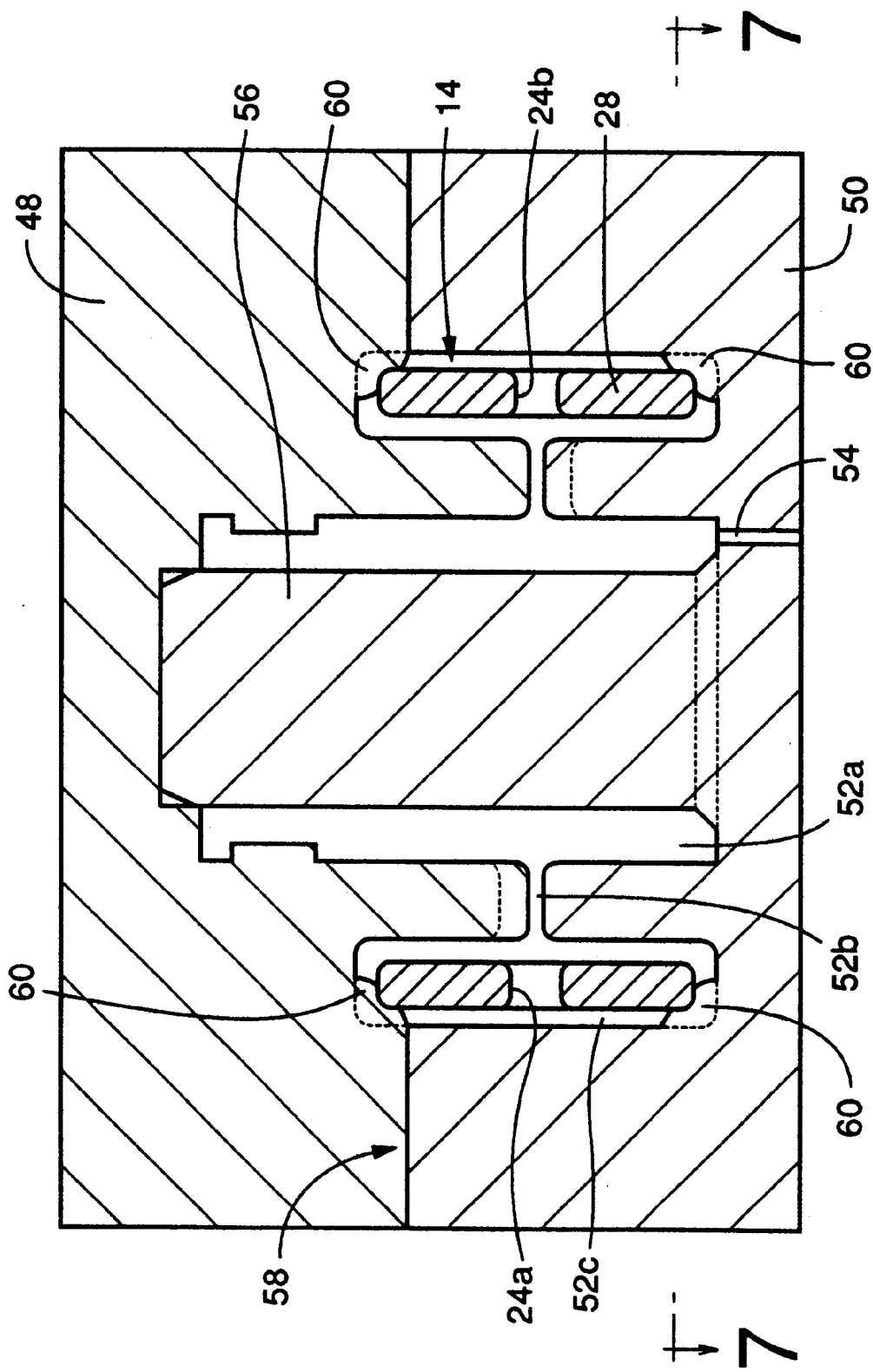
FIG. 6 is an elevational view in cross section of a mold consisting of two molds for forming an elastic support member, while the mass member of FIG. 3 is positioned in a predetermined position relative to the molds.
Figure 7:
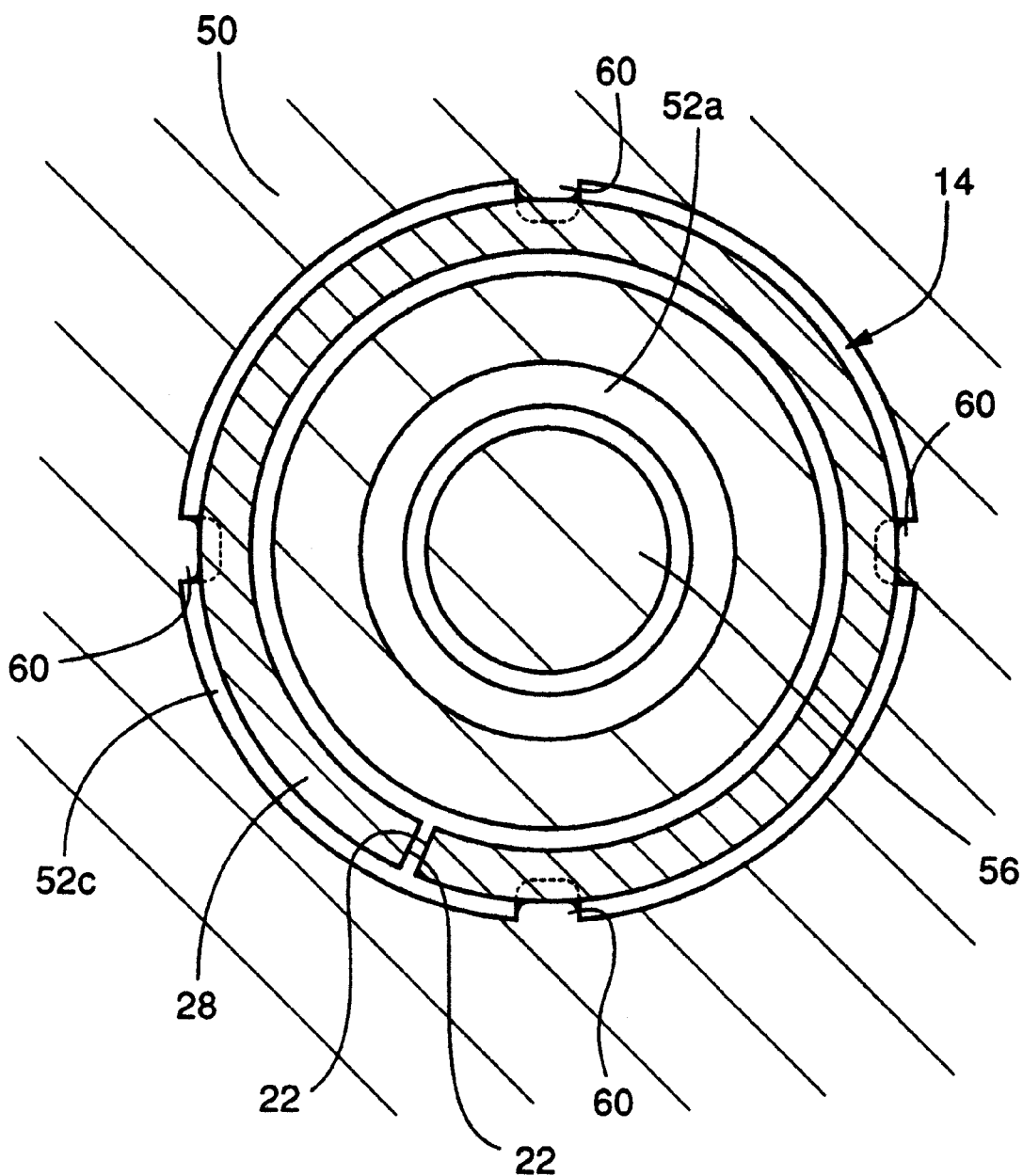
FIG. 7 is a cross sectional view taken along line 7—7 of FIG. 6.

Described more specifically, the mold consists of upper and lower molds 48,50 which cooperate to each other to define a mold cavity 52, as shown in FIGS. 6 and 7. The rubber material is supplied through an injection hole 54, so that the mold cavity 52 is filled with the rubber material, whereby the above-described integral structure is formed. The injection hole 54 is located radially inwardly of the mass member 14. The mold cavity 52 includes an inner tubular portion 52a for giving the tubular portion 12, an intermediate annular portion 52b for giving the elastically connecting portion 42, and an outer tubular portion 52c for giving the covering layer 40 which covers the mass member 14. These portions 52a, 52b, 52c communicate with each other, and define the single cavity. The lower mold 50 includes an axially extending boss portion 56 integrally formed at its central portion, so as to form the axial hole 16 of the tubular portion 12. While the boss portion 56 is a part of the lower mold 50 in the present embodiment, the boss portion 56 may be a part of the upper mold 48, or may be provided by a separate core member independent of the upper and lower molds 48, 50. Reference numeral 58 designates a parting line between the upper and lower molds 48, 50. The parting line 58 may be located in any axial position in the mold, as long as the parting line 58 is located radially outwardly of the outer tubular portion 52c of the mold cavity 52.

For forming the integral elastic body consisting of the tubular portion 12, the covering layer 40 and the elastically connecting portion 42, the mass member 14 is disposed within the outer tubular portion 52c of the mold cavity 52 which gives the covering layer 40. The outer tubular portion 52c of the mold cavity 52 has a cavity surface consisting of a radially outer portion, a radially inner portion, an axially upper portion and an axially lower portion. The mass member 14 is positioned at a predetermined position relative to the mold cavity 52, such that the mass member 14 and the outer tubular portion 52c are coaxial with each other, and such that the mass member 14 is radially spaced apart from the radially outer and inner portions of the cavity surface of the outer tubular portion 52c, and is axially spaced apart from the axially upper and lower portions of the cavity surface of the outer tubular portion 52c. Each of the upper and lower molds 48, 50 has four positioning protrusions 60 which extend radially inwardly from the radially outer portion of the cavity surface of the outer tubular portion 52c at the axially upper or lower ends of the outer tubular portion 52c. The positioning protrusions 60 are substantially equally spaced apart from each other in the circumferential direction of the outer tubular portion 52c. The positioning protrusions 60 serve to easily position the mass member 14 in the predetermined position relative to the mold cavity 52 in the axial and radial directions.

Each of the positioning protrusions 60, which projects radially inwardly from the radially outer portion of the cavity surface of the outer tubular portion 52c, and axially inwardly from the axially upper or lower portion of the cavity surface of the outer tubular portion 52c, has a generally L shape in the cross section of FIG. 6. Each positioning protrusion 60 extends also in the circumferential direction such that the radially inner end face and the axially inner end face of each positioning protrusion 60 are held in contact with the outer circumferential surface and the axial end face of the mass member 14, respectively. The circumferential dimension of each positioning protrusion 60 is larger than that of the circumferential gap between the circumferentially opposite end faces 22, 22. Thus, the mass member 14 is assuredly held at the four circumferential positions by the four positioning protrusions 60, so as to be accurately positioned relative to the upper or lower mold 48, 50 in the axial and radial directions, irrespective of the position of the circumferential gap relative to the upper or lower mold 48, 50 in the circumferential direction. It is noted that each positioning protrusion 60 can be dimensioned to have a minimum contact surface area sufficient for accurately positioning the mass member 14 in the predetermined position, thereby making it possible to maximize the surface area of the mass member 14 which is covered by the covering layer 40.

The dynamic damper 10 constructed as described above is mounted on the drive shaft, at its tubular portion 12. With the dynamic damper 10 mounted on the drive shaft, the mass member 14 is placed in a substantially coaxial relation with the drive shaft, and is elastically supported on the drive shaft. The mass member 14 is permitted to be displaced relative to the drive shaft in a direction perpendicular to the axial direction, owing to elastic deformation of the elastically connecting portion 42. In this view, the dynamic damper 10 constitutes a vibration system in which the mass member 14 and other portion of the dynamic damper 10 that are displaceable relative to the drive shaft serve as a mass while the elastically connecting portion 42 that elastically supports the mass member 14 with respect to the drive shaft serves as a spring. The thus constituted vibration system serves as a secondary vibration system with respect to the drive shaft which is a primary vibration system, and accordingly is capable of functioning as a dynamic vibration absorber to absorb the vibrations of the drive shaft in a direction perpendicular to the axis of the drive shaft. The mass of the mass member 14 and the spring characteristics of the elastically connecting portion 42 are suitably determined depending upon the frequency of the vibrations of the drive shaft to be damped, by taking account of the temperature and other operating conditions and the characteristics of the elastic body constituting the elastically connecting portion 42, so that the dynamic damper 10 exhibits a satisfactory damping effect with respect to the vibrations. Described more specifically, the resonance frequency of the secondary vibration system constituted by the mass member 14 and the elastically connecting portion 42 is tuned, for example, so as to be held in a frequency range corresponding to the resonance frequency of a suspension system which is linked to driving wheels of the motor vehicle, so that the dynamic damper 10 exhibits a sufficiently high degree of damping effect with respect to the vibrations in a specific frequency range (e.g. 70–150Hz) corresponding to the resonance frequency of the suspension system.

In the present dynamic damper 10, the mass member 14 is formed by rolling the flat plate 28 which is obtained by blanking or otherwise forming a rolled steel plate. Accordingly, the mass member 14 can be manufactured more easily at a further reduced cost, as compared with a conventional mass member which is formed of a cylindrical member which is obtained by cutting a metallic pipe, or by forging or casting. Further, the mass member 14 is obtained by rolling the flat plate 28, without its circumferentially opposite end faces being fixed to each other by welding or other means, whereby the production efficiency and cost of the present dynamic damper are remarkably improved and lowered, respectively.

Moreover, an uneven mass distribution in the mass member 14 due to the circumferential gap provided between the circumferentially opposite end faces 22, 22 of the flat plate 28 is advantageously corrected by the through-holes 24 and the recesses 36, whereby the dynamic damper 10 is satisfactorily balanced so as to exhibit a high damping effect. The through-holes 24 and the recesses 36 can be easily formed simultaneously with the formation of the outer contour of the flat plate 28, as described above, without using an additional member. Thus, the present dynamic damper 10 is capable of exhibiting a satisfactory damping effect, without deteriorating and increasing the production efficiency and cost of the flat plate 28 or mass member 14, respectively.

While the present invention has been described in detail with its presently preferred embodiment for the illustrative purpose only, it is to be understood that the invention is not limited to the details of the illustrated embodiment, but may be otherwise embodied.

For instance, the number, size, shape and arrangement of the through-holes 24, which cooperate with the recesses 36 to constitute the balancing means or mass-reducing means, are not limited to the details of the illustrated embodiment, but may be changed or modified, as long as the changed or modified number, size, shape or arrangement of the through-holes 24 provides the mass member 14 with a required mass value and a satisfactory balance about the axis. Described more specifically, more than or less than eight through-holes may be formed in the mass member 14 so as to be circumferentially arranged at the same axial position, or at two or more different axial positions. Alternatively, all or some of the through-holes may be offset from each other in the axial direction of the mass member 14. Further, it is possible to form only one through-hole or more than one through-holes exclusively in a portion diametrically opposed to the above-described circumferential gap between the opposite end faces 22, 22. Moreover, a concavity or blind hole may be formed in the mass member 14 in place of or in addition to the through-holes 24. While the four recesses 36 are provided at the respective four positions of the flat plate (final product portion) 28 which are defined by the final product portion 28 and the corresponding adjacent bridge portions 30 in the above-illustrated embodiment, the number, size, shape or arrangement of the recesses 36 may also be suitably changed or modified.

In the above-illustrated embodiment, the balancing means includes the mass-reducing means which is constituted by the through-holes 24 and the recesses 36 provided to be substantially diametrically opposed to the circumferential gap between the opposite end faces 22, 22. However, the balancing means may further include mass-increasing means for increasing the mass in at least one local portion of the flat plate 28 which is located in the vicinity of the circumferentially opposite end faces 22, 22 of the flat plate 28. To this end, for example, an axial projection or projections may be formed at or near the circumferentially opposite end faces 22, 22, so as to extend outwardly in the axial direction.

While the plurality of flat plates 28 each formed into the mass member 14 are obtained from the intermediate product 32 which is formed according to a cut-and-carry method in the above-illustrated embodiment, the flat plates 28 may be obtained by blanking respective sheet materials independent of each other.

The construction of the elastic support member is not limited to the details of the illustrated embodiment, but may be suitably modified depending upon space available for installation of the dynamic damper, the required damping characteristics, or other factors. For example, the elastic support member may be constructed, as disclosed in JP-Y2-02-31626, such that the elastically connecting portion, which elastically connects the tubular portion and the mass member, includes a radially projecting portion radially outwardly projecting from the tubular portion, and an axially projecting portion projecting from the radially inner end of the radially projecting portion in the axial direction, so as to have a generally L-shaped cross section, so that the dynamic damper advantageously exhibits a sufficiently high damping effect with respect to vibrations of the drive shaft in the axial direction as well as those in the radial direction. Alternatively, the elastic support member may be constructed, as disclosed in JP-A-08-28627, such that the elastic support member includes a pair of tubular portions which are positioned on the axially opposite sides of the mass member and which are axially spaced apart from each other in the axial direction, and a pair of cylindrically-shaped elastically connecting portions each axially extending from the axially inner end portion of the corresponding one of the tubular portions to the corresponding one of the axially opposite end portions of the mass member, so as to elastically connect the mass member and the tubular portions.

Further, it is possible to adapt the dynamic damper of the present invention to exhibit a damping effect with respect to torsional vibrations of the rotary shaft, by suitably adjusting an inertial mass of the mass member and spring characteristics of the elastic support member.

The covering layer 40 provided to cover the surface of the mass member 14 is not essential depending upon the operating condition or other factors. A rust-preventive paint, for example, may be applied to the surface of the mass member 14, in place of the covering layer 40.

Although the specific embodiment of the dynamic damper adapted to be mounted on the drive shaft for use in a motor vehicle has been described above, the invention is not limited to the illustrated embodiment, but the principle of the invention is equally applicable to other dynamic dampers which are to be mounted on various kinds of rotary shaft such as a power transmission shaft, and a conduit whose application is not limited to the motor vehicle.

It is also to be understood that the present invention may be embodied with various changes, modifications and improvements which may occur to those skilled in the art, without departing from the spirit and scope of the invention.

As is clear from the foregoing description, in the dynamic damper constructed according to the present invention, the mass member is formed by rolling the flat plate into a generally cylindrical shape, and the uneven distribution of the mass in the circumferential direction of the mass member due to the circumferential gap between the opposite end faces of the rolled flat plate is advantageously corrected by the balancing means, thereby assuring sufficiently high damping performance of the dynamic damper while remarkably improving the efficiency of manufacture and accordingly reducing the cost of manufacture of the dynamic damper.

In the operation for forming the elastic support member in the mold according to the method of the present invention, the mass member is advantageously held at its outer circumferential surface by the positioning protrusion provided in the mold, so that the mass member is prevented from being deformed or displaced relative to the mold, thereby maintaining excellent rotary balance of the mass member about the axis and accordingly assuring an improved quality of the dynamic damper with high consistency.

Further, according to the method of the present invention, the rotary balance of the mass member as a unit is measured so as to be adjusted on the basis of the measurement, before the mass member is fixed to the elastic support member, so that the rotary balance of the mass member about the axis is further improved.

What is claimed is:

1. A dynamic damper for damping vibration of a rotary shaft, comprising:
    a mass member having a generally cylindrical shape and formed from a plate having a predetermined contour, said plate being rolled into said generally cylindrical shape and including circumferentially opposite end portions which are opposed to each other in a circumferential direction thereof and which are unconnected to each other;
    an elastic support member to be mounted on said rotary shaft, for elastically supporting said mass member with respect to said rotary shaft such that said mass member is displaceable relative to said rotary shaft; and
    balancing means for maintaining a rotary balance of said mass member about an axis of said mass member,
        wherein said circumferentially opposed end portions of said plate have respective end faces which are spaced apart from each other with a circumferential gap in said circumferential direction, and wherein said balancing means cooperates with said circumferential gap to maintain said rotary balance of said mass member about said axis, said balancing means comprising at least one of mass-reducing means for reducing a mass of a circumferentially central portion of said plate which is substantially diametrically opposed to said circumferential gap, and mass-increasing means for increasing a mass of said circumferentially opposite end portions of said plate.

2. A dynamic damper for damping vibration of a rotary shaft, comprising:
    a mass member having a generally cylindrical shape and formed from a plate having a predetermined contour, said plate being rolled into said generally cylindrical shape and including circumferentially opposite end portions which are opposed to each other in a circumferential direction thereof and which are unconnected to each other;
    an elastic support member to be mounted on said rotary shaft, for elastically supporting said mass member with respect to said rotary shaft such that said mass member is displaceable relative to said rotary shaft; and
    balancing means for maintaining a rotary balance of said mass member about an axis of said mass member,
        wherein said balancing means comprises mass-reducing means for reducing a mass of at least one local portion of said plate, said at least one local portion being located in a circumferentially central portion of said plate which is substantially diametrically opposed to said circumferentially opposite end portions of said plate.

3. A dynamic damper according to claim 2, wherein said mass-reducing means comprises at least one hole formed in said at least one local portion of said plate.

4. A dynamic damper according to claim 2, wherein said mass-reducing means comprises at least one recess at each of axially opposite end faces of said circumferentially central portion of said plate, so as to extend inwardly from the axially opposite end face.

5. A dynamic damper according to claim 2, wherein said plate is obtained from an intermediate product which is formed from a sheet material by a blanking operation, said intermediate product having a plurality of final product portions each of which has said predetermined contour so as to provide said plate and which are arranged and spaced apart from each other in a predetermined direction, and a plurality of bridge portions each of which is interposed between two of said final product portions adjacent to each other in said predetermined direction so as to connect the two adjacent final product portions, each of said final product portions being connected, at a central portion thereof which corresponds to said circumferentially central portion of said plate, to said bridge portions, and wherein said mass-reducing means comprises at least one recess provided in a cutting portion of each of said final product portions which is adjacent to the corresponding one of said bridge portions and at which each of said final product portions is cut off from said corresponding one of said bridge portions.

6. A dynamic damper according to claim 5, wherein said at least one recess is located on at least one of opposite sides of each of said bridge portions as viewed in a direction perpendicular to said predetermined direction in which said final product portions are arranged, and is formed in an end face of the corresponding one of said final product portions, said end face being perpendicular to said predetermined direction.

7. A dynamic damper for damping vibration of a rotary shaft, comprising:

a mass member having a generally cylindrical shape and formed from a plate having a predetermined contour, said plate being rolled into said generally cylindrical shape and including circumferentially opposite end portions which are opposed to each other in a circumferential direction thereof and which are unconnected to each other;

an elastic support member to be mounted on said rotary shaft, for elastically supporting said mass member with respect to said rotary shaft such that said mass member is displaceable relative to said rotary shaft; and balancing means for maintaining a rotary balance of said mass member about an axis of said mass member, wherein said balancing means comprises a plurality of through-holes formed through said plate in a thickness direction of said plate and spaced apart from each other in said circumferential direction, said plurality of through-holes having respective diameters different from each other.

8. A dynamic damper according to claim 7, wherein said plurality of through-holes comprises at least one large hole and at least one small hole having a diameter smaller than that of said at least one large hole, and wherein said at least one small hole is located nearer to said circumferentially opposite end portions, than said at least one large hole.

9. A dynamic damper for damping vibration of a rotary shaft, comprising:

a mass member having a generally cylindrical shape and formed from a plate having a predetermined contour, said plate being rolled into said generally cylindrical shape and including circumferentially opposite end portions which are opposed to each other in a circumferential direction thereof and which are unconnected to each other;

an elastic support member to be mounted on said rotary shaft, for elastically supporting said mass member with respect to said rotary shaft such that said mass member is displaceable relative to said rotary shaft; and balancing means for maintaining a rotary balance of said mass member about an axis of said mass member, wherein said balancing means comprises mass-increasing means for increasing amass of at least one local portion of said plate, said at least one local portion being located in said circumferentially opposite end portions of said plate.

10. A dynamic damper according to claim 9, wherein said mass-increasing means comprises at least one protrusion formed in said at least one local portion of said plate and protruding axially outwardly from said at least one local portion of said plate.

11. A dynamic damper according to claim 2, wherein said elastic support member is formed of an elastic body, and comprises a tubular potion which is to be fitted onto said rotary shaft and which is located radially inwardly of said mass member and placed in a substantially coaxial relation with said mass member, and an elastically connecting portion which is formed integrally with said tubular portion and which elastically connects said tubular portion and said mass member.

12. A method of manufacturing a dynamic damper for damping vibration of a rotary shaft, comprising:

a mass member having a generally cylindrical shape and formed from a plate having a predetermined contour, said plate being rolled into said generally cylindrical shape and including circumferentially opposite end portions which are opposed to each other in a circumferential direction thereof and which are unconnected to each other;

an elastic support member to be mounted on said rotary shaft, for elastically supporting said mass member with respect to said rotary shaft such that said mass member is displaceable relative to said rotary shaft; and balancing means for maintaining a rotary balance of said mass member about an axis of said mass member, said method comprising:

a step of positioning said mass member in a mold cavity in a mold to form said elastic support member, with said mass member being held in contact, at each of at least three portions of an outer circumferential surface of said mass member circumferentially spaced apart from each other, with a positioning protrusion provided in said mold, so that said mass member is prevented from being displaced relative to said mold in a radial direction of said mass member; and a step of injecting a molding material into said mold cavity of said mold through an injection hole located radially inwardly of said mass member which is positioned in said mold, for thereby forming said elastic support member.

13. A method according to claim 12, wherein said positioning protrusion has a contact surface which is held in contact with said outer circumferential surface of said mass member, and said contact surface has a circumferential dimension larger than a circumferential dimension of a circumferential gap defined by said circumferentially opposite end portions of said plate.

14. A method according to claim 12, wherein said positioning protrusion comprises at least three positioning protrusions which are circumferentially spaced apart from each other, and which are positioned adjacent to axially opposite end faces of said mass member positioned in said mold, so that said mass member is held in contact, at said outer circumferential surface and said axially opposite end faces of said mass member, with said positioning protrusions, for thereby preventing said mass member from being displaced relative to said mold in an axial direction of said mass member as well as in said radial direction.

15. A method of manufacturing a dynamic damper for damping vibration of a rotary shaft, comprising:

a mass member having a generally cylindrical shape and formed from a plate having a predetermined contour, said plate being rolled into said generally cylindrical shape and including circumferentially opposite end portions which are opposed to each other in a circumferential direction thereof and which are unconnected to each other;

an elastic support member to be mounted on said rotary shaft, for elastically supporting said mass member with respect to said rotary shaft such that said mass member is displaceable relative to said rotary shaft; and balancing means for maintaining a rotary balance of said mass member about an axis of said mass member, said method comprising:

a step of measuring a rotary balance of said mass member about an axis of said mass member, before said mass member is fixed to said elastic support member;

a step of determining an arrangement of said balancing means on the basis of a result of the measurement of said rotary balance, so as to change a mass of at least one local portion of said plate for thereby adjusting said rotary balance; and a step of providing said dynamic damper with said balancing means having the determined arrangement.

* * * * *